US012781552B2

(12) United States Patent
Östberg

(10) Patent No.: US 12,781,552 B2
(45) Date of Patent: Nov. 3, 2026

(54) SEPARABLE HINGE

(71) Applicant: M ÖSTBERG DESIGN AND DEVELOPMENT AB, Borlänge (SE)

(72) Inventor: Mikael Östberg, Borlänge (SE)

(73) Assignee: M ÖSTBERG DESIGN AND DEVELOPMENT AB, Borlänge (SE)

( * ) Notice: Subject to any disclaimer, the term of this patent is extended or adjusted under 35 U.S.C. 154(b) by 0 days.

(21) Appl. No.: 19/138,767

(22) PCT Filed: Dec. 15, 2023

(86) PCT No.: PCT/EP2023/086126
§ 371 (c)(1),
(2) Date: Jun. 13, 2025

(87) PCT Pub. No.: WO2024/126816
PCT Pub. Date: Jun. 20, 2024

(65) Prior Publication Data

US 2026/0210164 A1 Jul. 23, 2026

(30) Foreign Application Priority Data

Dec. 16, 2022 (SE) .................................... 2251472-3

(51) Int. Cl.
*E05D 7/10* (2006.01)
*A63C 11/22* (2006.01)

(52) U.S. Cl.
CPC ............ *E05D 7/1072* (2013.01); *A63C 11/22* (2013.01)

(58) Field of Classification Search
CPC ....... E05D 7/10; E05D 7/1005; E05D 7/1016; E05D 7/1044; E05D 7/105; E05D 7/1022;
(Continued)

(56) References Cited

U.S. PATENT DOCUMENTS 3,333,726 A * 8/1967 Belanger ............... E05D 7/1072 16/257
4,598,889 A * 7/1986 Remington ............... B64C 9/02 244/130

(Continued)

FOREIGN PATENT DOCUMENTS

AT 15776 U1 5/2018
CH 562041 A5 5/1975

(Continued)

OTHER PUBLICATIONS

International Search Report and Written Opinion mailed Apr. 24, 2024 in corresponding International Application No. PCT/EP2023/086126.

(Continued)

*Primary Examiner* — Chuck Y Mah
(74) *Attorney, Agent, or Firm* — Renner, Otto, Boisselle & Sklar, LLP

(57) ABSTRACT

A joint arrangement suitable e.g. for a ski pole with a pivotable hand support or for a box with a lid. The joint arrangement comprises an interior joint part comprising a joint pin comprising an inner pin portion and an outer pin portion, and an exterior joint part comprising a joint recess comprising an inner recess portion and an outer recess portion. The inner recess portion is adapted to extend around more than half the circumference of the inner pin portion but leave an inner gap through which the inner pin portion may enter and exit, and the outer recess portion comprises a corresponding outer gap. The inner and outer pin portions comprise inner and outer circumferentially offset release sections. The joint pin may enter and exit the joint recess only when the inner release section is rotationally aligned with the inner gap and the outer release section is aligned with the outer gap.

21 Claims, 8 Drawing Sheets

(58) Field of Classification Search
CPC ... E05D 7/1055; E05D 7/1072; E05D 7/1077; E05D 2007/1027; E05D 5/128; E05D 5/16; E05D 5/065; E05D 5/10; E05D 3/02; E05D 11/10; E05D 2007/126; E05D 2005/106; E05D 2005/108; E05D 2005/12; E05D 2005/125; E05D 2005/127; E05D 2005/128; H02B 1/38; H02B 1/44; H02B 1/46; A63C 11/22; A63C 11/222; A63C 11/2224; A63C 11/2228
See application file for complete search history.

(56) References Cited

U.S. PATENT DOCUMENTS

| | | | | | |
|---|---|---|---|---|---|
| 5,048,715 | A * | 9/1991 | Wolff | B65D 43/168 | 220/840 |
| 5,269,046 | A * | 12/1993 | Newby, Sr. | E05D 7/1072 | 16/386 |
| 5,455,987 | A * | 10/1995 | Svehaug | E05F 1/063 | 16/385 |
| 6,491,323 | B1 | 12/2002 | Kustritz | | |
| 10,681,828 | B1 * | 6/2020 | Baldwin | H05K 5/0208 | |
| 2009/0277369 | A1 * | 11/2009 | Gai | B63B 39/061 | 114/286 |
| 2012/0199513 | A1 * | 8/2012 | Wagner | B65D 21/0233 | 206/505 |
| 2015/0300063 | A1 * | 10/2015 | Soma | E05D 7/1055 | 16/231 |

FOREIGN PATENT DOCUMENTS

| | | | | |
|---|---|---|---|---|
| DE | 102013003302 | B3 * | 7/2014 | E05D 3/02 |
| EP | 2135646 | A2 | 12/2009 | |
| FR | 2295205 | A * | 8/1976 | |
| FR | 2558512 | A1 * | 7/1985 | E05D 7/081 |
| FR | 3097890 | A1 * | 1/2021 | E05D 7/1066 |
| WO | 2006005840 | A1 | 1/2006 | |
| WO | 2019084586 | A1 | 5/2019 | |
| WO | 2022248897 | A1 | 12/2022 | |

OTHER PUBLICATIONS

Office Action mailed Aug. 8, 2023 in corresponding Swedish Application No. 2251472-3.

Anonymous : “Nouveaux couteaux Plum Light”, Nov. 3, 2014 (Nov. 3, 2014), XP055724422, Retrieved from the Internet: URL: https://communitytouringclub.com/nouveaux-couteaux-plum-toujours-plus-vite-2/ [retrieved on Aug. 21, 2020] figure 2.

Collector: “Probleme de couteau Spark et split 4 parties”, Dec. 8, 2018 (Dec. 8, 2018), XP055725458, Retrieved from the Internet: URL: https://splitboard.forumactif.com/t1954-probleme-de-couteaux-spark-et-split-4-parties [retrieved on Aug. 26, 2020] figure 1.

* cited by examiner

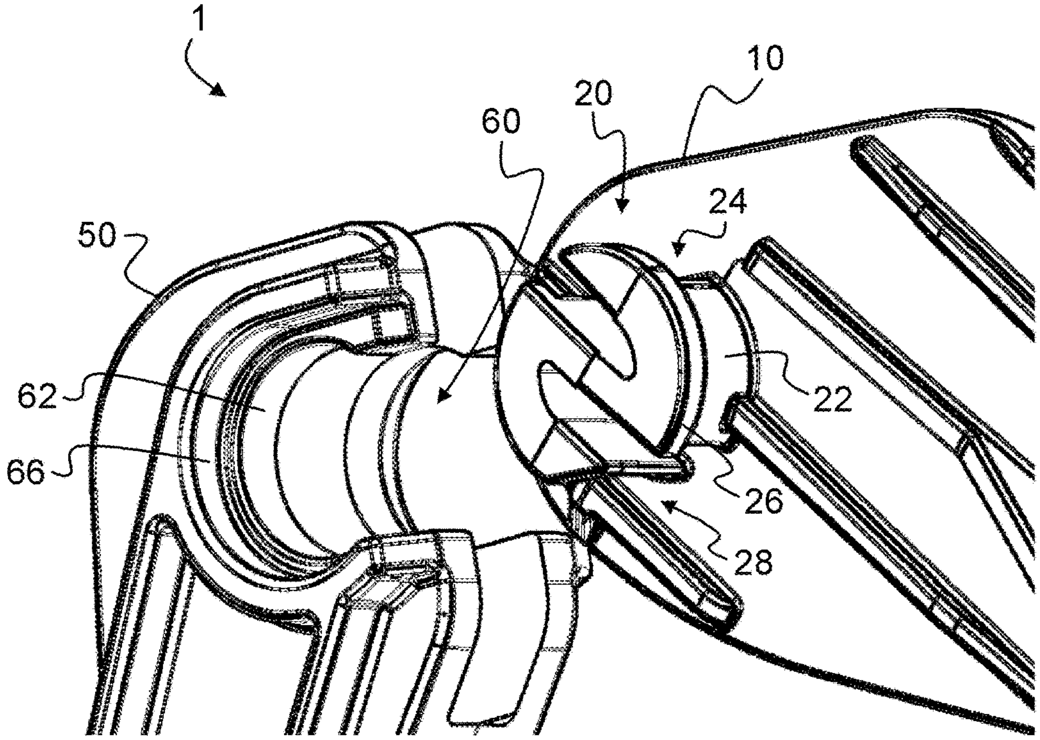
Fig 1
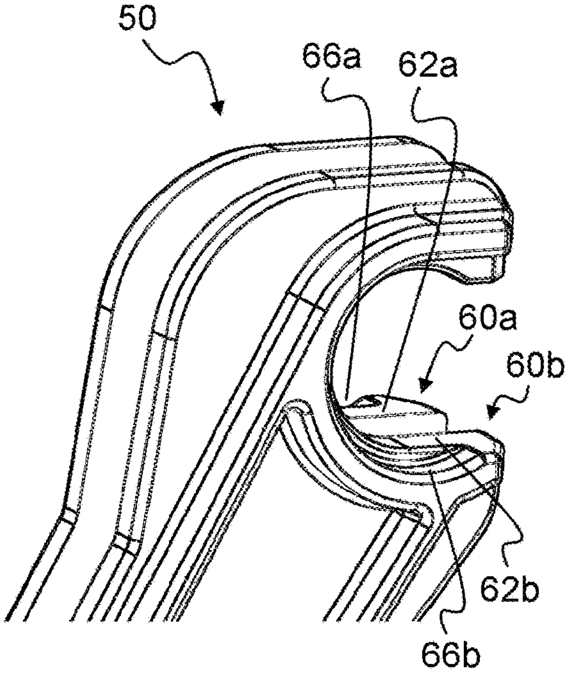
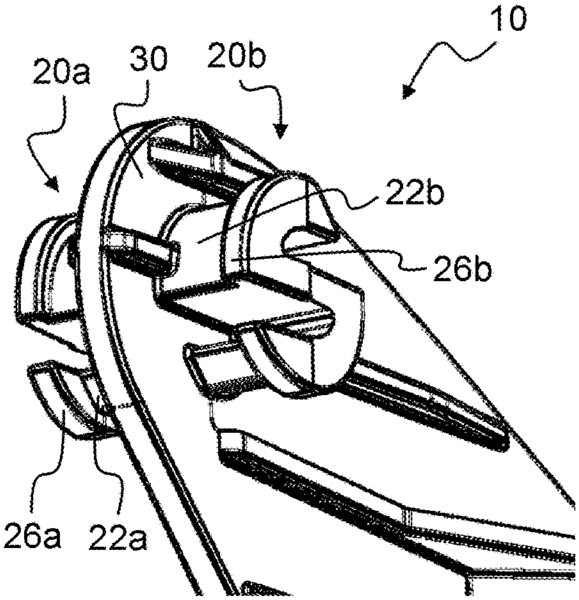
Fig 2
Fig 3

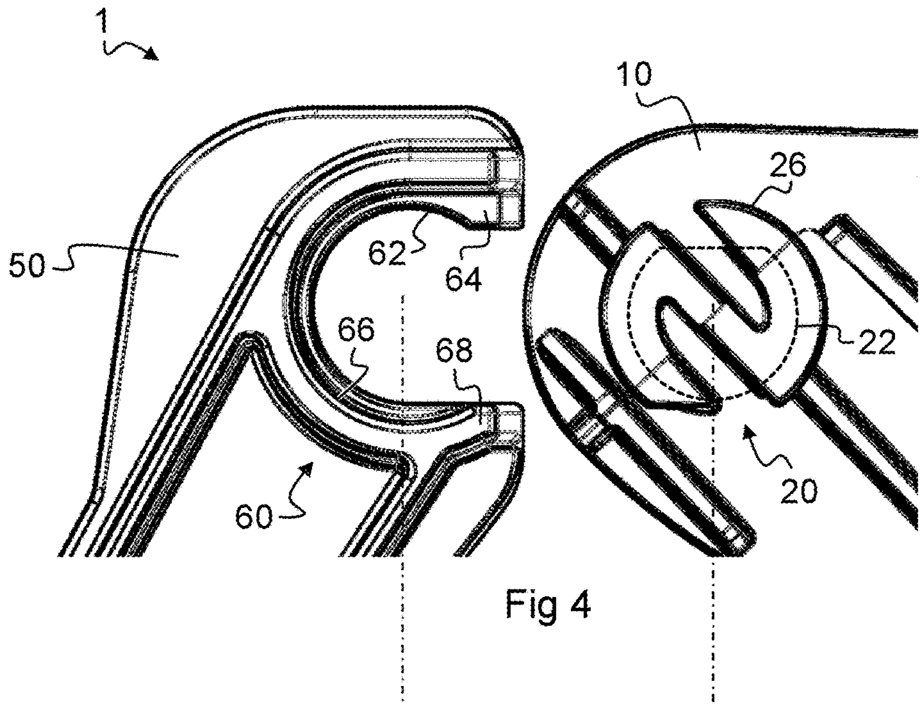
Fig 4
Fig 5a
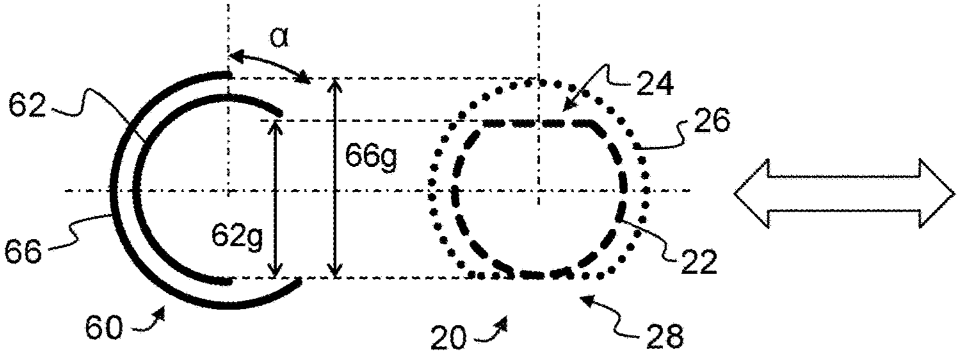
Fig 5b
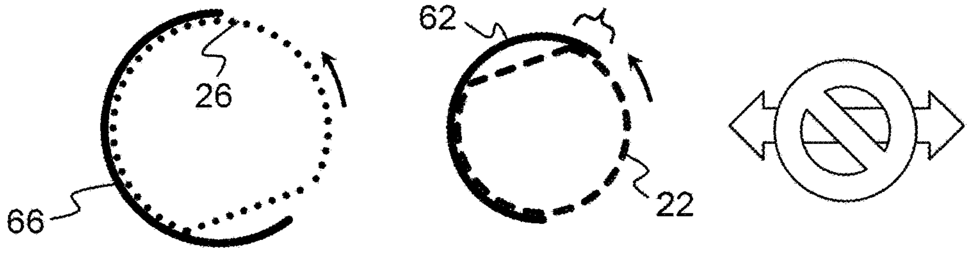
Fig 5c
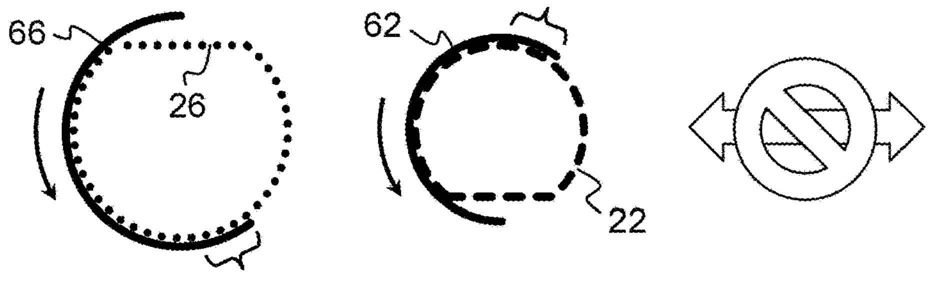

SEPARABLE HINGE

This application is a national phase of International Application No. PCT/EP2023/086126 filed Dec. 15, 2023, which claims priority to Swedish Application No. 2251472-3 filed Dec. 16, 2022, each of which is hereby incorporated herein by reference in its entirety.

CO-PENDING PATENT APPLICATION

The present patent application is filed concurrently with the related European patent application as per below by the same applicant. Details on specific issues in the patent applications are to be considered as incorporated into each one of patent applications. The related European (EP) patent application is titled "A Ski Pole Assembly comprising a Hand Support and a Holder" and has the filing number 22214096.4.

TECHNICAL FIELD

The present disclosure generally pertains to a joint, and more particularly to a joint arrangement comprising an interior joint part with a joint pin and an exterior joint part with a joint recess. The joint is e.g. suitable for a ski pole with a pivotable hand support.

BACKGROUND ART

Joints are elementary mechanical elements that are used in a great variety of applications. One common joint is the hinge joint, which typically comprises two joint parts and a joint pin that connect the two joint parts to one another.

One example of a prior art joint is shown in EP2135646A2 that discloses holding means pivotally connected to a shaft by means of a joint that comprises a separate pin (item 10 in EP2135646A2, cf. FIG. 2).

Hand held poles are commonly used for maintaining balance and increasing speed when skiing or walking. Examples of such poles are cross-country ski poles, alpine ski poles, nordic poles and walking poles. The poles traditionally have a handle at the top for the hand of a user to grip comfortably around.

At the end phase of a pole-push in cross-country skiing, i.e. when the pole is pushed furthest backwards from the skier, the skier's wrist pivots such that the top of the pole is pushed away and the length of the pole-push is increased thereby increasing the speed of skiing. The skier's hand is in other words used as a lever to push the pole further backwards.

The document EP2135646A2 mentioned above discloses a ski pole with a hand grip arranged at the upper end of a shaft, where the hand of a user is substantially fastened to the holding means and a pivoting movement of the hand with respect to the shaft is allowed.

SUMMARY OF THE INVENTION

It is an aim of the present disclosure to provide an improved joint. For example, it would be advantageous to provide an improved joint that allows disengagement, consists of few parts, is sturdy, low weight and/or cost-effective. It is a further aim to provide a joint that is suitable for providing an optimised ski pole with a pivotable hand support, or for providing a box with a pivotally and releasably connected lid.

According to a first aspect of the present disclosure, there is provided a joint arrangement suitable for a ski pole with a pivotable hand support. The joint arrangement comprises an interior joint part comprising a joint pin comprising an inner pin portion and outer pin portion, and an exterior joint part comprising a joint recess comprising an inner recess portion and an outer recess portion. The inner pin portion is adapted to be journalled in the inner recess portion and the outer pin portion is adapted to be journalled in the outer recess portion. The inner recess portion is adapted to extend around more than half the circumference of the inner pin portion but leave an inner gap through which the inner pin portion may enter and exit the inner recess portion. The outer recess portion is adapted to extend around more than half the circumference of the outer pin portion but leave an outer gap through which the outer pin portion may enter and exit the outer recess portion. The inner gap is circumferentially offset from the outer gap. The inner pin portion comprises an inner release section and the outer pin portion comprises an outer release section, and the inner release section is circumferentially offset from the outer release section. With such a joint arrangement, the joint pin may enter and exit the joint recess only when the inner release section is rotationally aligned with the inner gap and when the outer release section is rotationally aligned with the outer gap.

Such a joint arrangement may consists of few parts; only the interior joint part and the exterior joint part. The cooperating inner and outer pin portions and recess portions may result in a sturdy arrangement. In addition, the joint arrangement may be configured such that the interior and exterior parts may only be disengaged at one circumferential mutual position. The angular range at which disengagement is possible may be narrow, e.g. below 5 or 3 degrees, or even below 1 degree. The solution may further allow for a thin-walled thus low weight design, which may in addition be cost-effective i.a. because of low use of material. The joint arrangement may allow for cost-effective manufacture by injection moulding.

The joint arrangement may allow for mutual movement between the interior joint part and the exterior joint part in one plane only. The pivot axle, i.e. the axle along which joint pin extends, may be orthogonal to said plane. The present joint arrangement may be referred to as a hinge joint arrangement or a revolute joint arrangement. The exterior part may be referred to as a female part or socket part, whereas the interior part may be referred to as a male part or plug part.

The pin portions may be received in a rotary sliding manner in the recess portions, such that the connection there between may be free from play and sturdy. Thus, the dimensions of the recess portions may be only slightly larger than the dimensions of the pin portions. The joint pin may enter and exit the joint recess in a translational motion.

The joint arrangement does not require any separate joint pin or similar element, as is disclosed in e.g. EP2135646A2. Again, the joint arrangement may consist of the interior joint part and the exterior joint part.

The interior joint part may be formed in one piece, i.e. in a single piece. The exterior joint part may be formed in one piece. These two one-piece parts may constitute the joint arrangement.

The joint pin and/or the interior joint part may be manufactured by injection moulding. Additionally, or alternatively, the exterior joint part may be manufactured by injection moulding. To facilitate such manufacture, and to reduce weight and material use, the interior joint part and/or the exterior joint part may be thin-walled. By thin-walled may be meant that the wall thickness of the parts is less than 2.5 millimeters. The joint pin may be formed of a meandering, e.g. S-shaped, thin-walled structure. Said meandering thin-walled structure may extend in parallel with the joint pin. The joint arrangement may be thin-walled and comprise strengthening ribs.

The inner release section of the inner pin portion may be formed by a flat side of the inner pin portion. The inner pin portion circumference may have the general shape of a circle with a flat side, the flat side forming the inner release section.

The outer release section of the outer pin portion may be formed by a flat side of the outer pin portion. The outer pin portion circumference may have the general shape of a circle with a flat side, the flat side forming the outer release section.

The inner release section may be arranged opposite the outer release section. In other words, the inner release section may circumferentially offset by 180 degrees from the outer release section.

The inner gap of the inner recess portion may be circumferentially offset by 15 to 50 degrees, such as approximately 30 to 40 degrees, from the outer gap of the outer recess portion.

The joint pin may comprise a first pin section and an axially offset second pin section. The first pin section may comprise a first inner pin portion and a first outer pin portion and the second pin section may comprise a second inner pin portion and a second outer pin portion. The first pin section and the second pin section may be concentric. The first pin section and the second pin section may be mirror-symmetric. Such first and second pin sections may form a particularly sturdy joint arrangement. Another possible advantage is that axial forces may be absorbed by the joint arrangement.

Similarly, the joint recess may comprise a first recess section and an axially offset second recess section. The first recess section and the second recess section may be concentric. The first recess section may comprise a first inner recess portion and a first outer recess portion and the second recess section may comprise a second inner recess portion and a second outer recess portion. The first recess section and the second recess section may be mirror-symmetric.

The first and second sections and the first and second recess sections may provide a doubled joint arrangement as initially described. Thus, the first inner pin portion may be received in the first inner recess portion, the second inner pin portion may be received in the second inner recess portion, the first outer pin portion may be received in the first outer recess portion and the second outer pin portion may be received in the second outer recess portion.

The interior joint part may comprise a radially protruding portion arranged between the first pin section and the second pin section. The first pin section and the second pin section may be mirror-symmetric with respect to the radially protruding portion. The joint arrangement may be configured such that the protruding portion may be received between the first recess section and the second recess section. The radially protruding portion may be received in a radial recess between the first recess section and the second recess section. The first recess section and the second recess section may be mirror-symmetric with respect to the radial recess.

According to a second aspect of the present disclosure, there is provided a ski pole assembly comprising the above-described joint arrangement. The ski pole assembly comprises a hand support adapted to support a hand of a user, and a holder adapted to be attached to a stick. The interior joint part of the joint arrangement is comprised in one of the hand support or the holder and the exterior joint part is comprised in the other one of the hand support and the holder. In one embodiment, the hand support comprises the interior joint part and the holder comprises the exterior joint part.

Such a ski pole assembly may involve one or several of the advantages mentioned above with reference to the joint arrangement. In particular, the joint arrangement may provide a sturdy ski pole assembly in which the hand support may be distanced form the holder, and thus from a stick to which the holder is attached. The hand support may be disengaged from the holder at one angular position that may be selected, and the angular disengagement range may be narrow.

The hand support may be formed in one piece with the interior joint part or with the exterior joint part. The holder may be formed in one piece with the other one of the interior joint part or the exterior joint part. Thus, the ski pole assembly may consist of the hand support and the holder, and possibly an additional means for securing a hand of a user to the hand support. The hand support and/or the holder may be manufactured by injection moulding. The hand support and/or the holder may be thin-walled.

According to a third aspect of the present disclosure, there is provided a ski pole comprising a stick and the above-described ski pole assembly.

According to a fourth aspect of the present disclosure, there is provided a box with a lid comprising the above-described joint arrangement. The interior joint part of the joint arrangement is comprised in one of the box or the lid, and the exterior joint part is comprised in the other one of the box and the lid. In one embodiment, the box comprises the interior joint part and the lid comprises the exterior joint part. The box with a lid may be referred to as a casing with a lid. The box or casing may for example be configured to contain a fan, such as a duct fan.

The joint arrangement may find use in a great variety of applications, therefore, according to a more general aspect of the present disclosure, there is provided a joint arrangement comprising an interior joint part comprising a joint pin comprising an inner pin portion and outer pin portion, and an exterior joint part comprising a joint recess comprising an inner recess portion and an outer recess portion. The inner pin portion is adapted to be journalled in the inner recess portion and the outer pin portion is adapted to be journalled in the outer recess portion. The inner recess portion is adapted to extend around more than half the circumference of the inner pin portion but leave an inner gap through which the inner pin portion may enter and exit the inner recess portion. The outer recess portion is adapted to extend around more than half the circumference of the outer pin portion but leave an outer gap through which the outer pin portion may enter and exit the outer recess portion. The inner gap is circumferentially offset from the outer gap. The inner pin portion comprises an inner release section and the outer pin portion comprises an outer release section, and the inner release section is circumferentially offset from the outer release section.

With such a joint arrangement, the joint pin may enter and exit the joint recess only when the inner release section is rotationally aligned with the inner gap and when the outer release section is rotationally aligned with the outer gap.

Other possible features, and associated advantages, of such a joint arrangement include those mentioned above with reference to the joint arrangement suitable for a ski pole with a pivotable hand support.

BRIEF DESCRIPTION OF THE DRAWINGS

The present invention will be described further below by way of example and with reference to the enclosed drawings, in which:

FIG. 1 is an isometric view of a joint arrangement comprising an interior joint part and an exterior joint part, FIGS. 2 and 3 together correspond to FIG. 1, but show the joint arrangement from another angle, FIG. 4 is a plan view of the joint arrangement of FIGS. 1 to 3, FIGS. 5*a-c* schematically illustrate the joint arrangement of FIGS. 1 to 4 with its parts arranged in different rotational positions.

DETAILED DESCRIPTION OF EMBODIMENTS

Figure 6A:
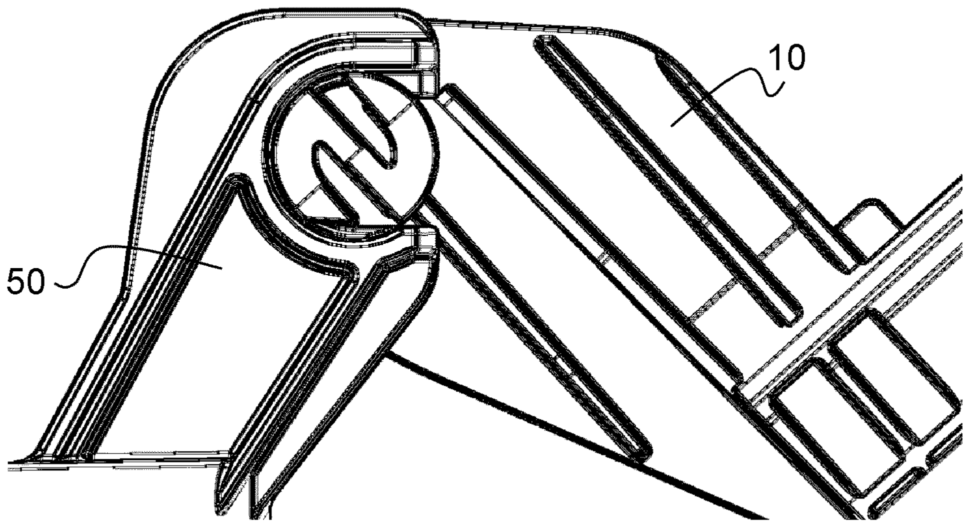
FIGS. 6*a-d* show the joint arrangement of FIGS. 1 to 4 with its parts arranged in different rotational positions.

Embodiments of the present disclosure will now be described more fully hereinafter with reference to the accompanying figures. Like reference numbers refer to like elements throughout the description and figures.

FIGS. 1 to 9 show a joint arrangement comprising an interior joint part 10 and an exterior joint part 50. FIGS. 10 to 14 show a box 300 with a lid 400 comprising the interior joint part 10 and the exterior joint part 50, respectively.

The interior joint part 10, best shown in FIG. 3 and to the right in FIG. 1, comprises a joint pin 20 that may be formed in one piece with the interior joint part 10. The joint pin 20 comprises an inner pin portion 22 and an outer pin portion 26. The radial dimension of the outer pin portion 26 exceeds the radial dimension of the inner pin portion 22. The outer pin portion 26 may essentially have the shape of a flange terminating the inner pin portion 22. The axial extension of the inner pin portion 22 may, as disclosed, exceed the axial extension of the outer pin portion 26. In the disclosed example, the axial extension of the inner pin portion 22 is approximately three to five times the axial extension of the outer pin portion 26. As is apprehended, these axial extensions may be varied and may be essentially equal, or the axial extension of the outer pin portion 26 may exceed the axial extension of the inner pin portion 22.

The exterior joint part 50, best shown in FIG. 2 and to the left in FIG. 1, comprises a joint recess 60 that may be formed in one piece with the exterior joint part 50. In other words, the joint recess 60 may be a void delimited by the exterior joint part 50. The joint recess 60 comprises an inner recess portion 62 and an outer recess portion 66. Referring in particular to the plan view of FIG. 4, the joint recess 60 may be essentially C-shaped.

In FIGS. 1 to 4 and 6, only the distal ends of the interior and exterior joint parts 10, 50 are shown. The joint parts 10, 50 are typically parts of respective items, or attached to respective items, that are to be pivotally and releasably connected to one another. Examples of such items are the hand support 200 shown in FIG. 7 and the holder 100 shown in FIG. 8, or the box 300 and lid 400 shown in FIGS. 10 to 14. The holder 100 and the hand support 200 are shown in their entirety and in assembled state in FIG. 9.

As is illustrated in FIGS. 1 to 6, the joint pin 20 is received in the joint recess 60. More precisely, the inner pin portion 22 is adapted to be journalled in the inner recess portion 62 and the outer pin portion 26 is adapted to be journalled in the outer recess portion 66. As is particularly clear from FIGS. 4 and 5, the inner pin portion 22 and the inner recess portion 62 are adapted to slidingly engage one another. The inner pin portion 22 is rotatably journalled in the inner recess portion 62. The outer pin portion 26 and the outer recess portion 66 are adapted to slidingly engage one another. The outer pin portion 26 is rotatably journalled in the outer recess portion 66.

As is best shown in FIG. 4, the inner recess portion 62 extends around more than half the circumference of the inner pin portion 22 but leaves an inner gap 62*g* through which the inner pin portion 22 may enter and exit the inner recess portion 62. Similarly, the outer recess portion 66 extends around more than half the circumference of the outer pin portion 26 but leaves an outer gap 66*g* through which the outer pin portion 26 may enter and exit the outer recess portion 66.

FIG. 5*a* illustrates the orientation of the inner recess portion 62 and the outer recess portion 66 to the left, and the orientation of the inner pin portion 22 and the outer pin portion 26 to the right. The inner and outer recess portions 62, 66 may, as is shown, be continuous apart from the gaps 62*g*, 66*g*. The inner recess portion 62 and the outer recess portion 66 may both be C-shaped, with the open portion of the C-shape being circumferentially offset by the angle $\alpha$. In FIG. 5 *a*, the angle $\alpha$ is approximately 35 degrees. The inner gap 62*g* is correspondingly circumferentially offset a from the outer gap 66*g*.

As shown in FIGS. 1 to 6 and indicated in FIG. 5*a*, the inner pin portion 22 comprises an inner release section 24 and the outer pin portion 26 comprises an outer release section 28. In the illustrated embodiment, the release sections 24, 28 are formed by flat sides of the pin portions 22, 26. As is shown e.g. to the right in FIGS. 4 and 5*a*, the inner release section 24 is circumferentially offset from the outer release section 28. In the illustrated embodiment, the inner release section 24 is arranged opposite the outer release section 28.

The above-described design results in that the joint pin 20 may only enter and exit the joint recess 60 when the inner release section 24 is rotationally aligned with the inner gap 62*g* and when the outer release section 28 is rotationally aligned with the outer gap 66*g*. This situation is disclosed in FIGS. 4 and 5*a* (and 6*a*). In the respective angular orientations of FIGS. 4 and 5*a*, the inner pin portion 22 may enter and exit the inner recess portion 62 and the outer pin portion 26 may enter and exit the outer recess portion 66. In other words, when mutually rotationally aligned as in FIGS. 4 and 5*a*, the joint pin 20 may enter and exit the joint recess 60, as is indicated by the hollow double-pointed arrow in FIG. 5*a*. As is to be apprehended, the present joint arrangement 1 may be tailored such that the exact angular orientation, and the angular range, at which the joint pin 20 and the joint recess 60 may be disengaged can be selected as desired.

In FIGS. 5*a*-5*c*, the inner pin portion 22 is illustrated by a dashed line and the outer pin portion 26 is illustrated by a dotted line. FIGS. 5*b* and 5*c* illustrate the outer recess portion 66 and the outer pin portion 26 to the left, and the inner recess portion 62 and the inner pin portion 22 to the right. FIGS. 5*b* and 5*c* are provided to elucidate how respective angular positions allow or hinder the joint pin 20 and joint recess 60 from being disengaged.

Figure 6B:
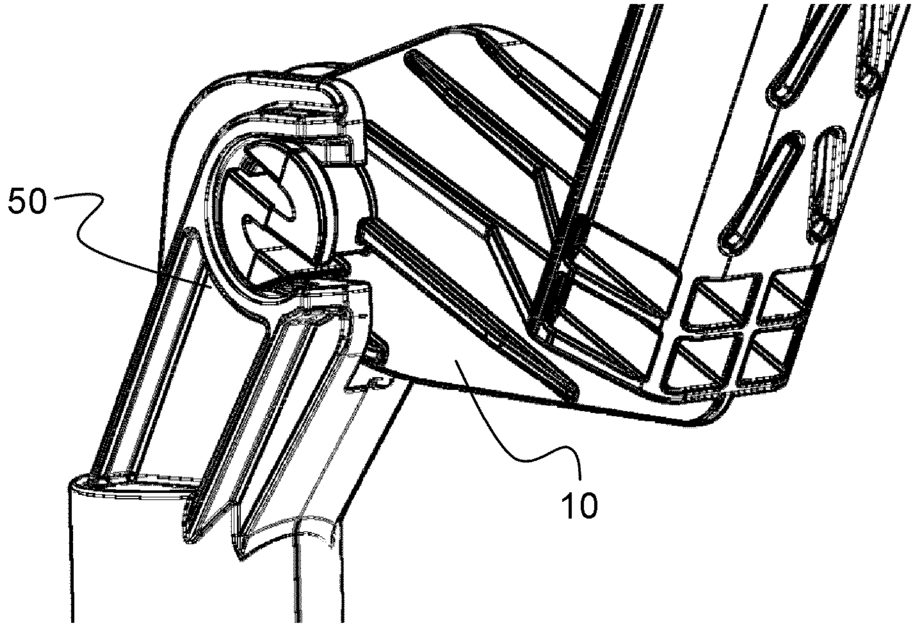
Figure 6C:
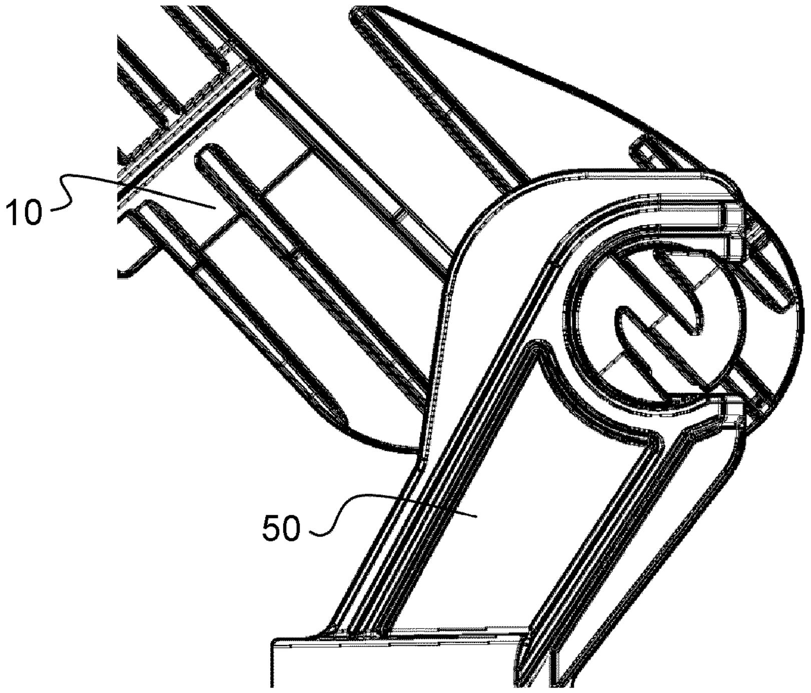

FIG. 5*a* (and 4 and 6*a*) illustrates the joint pin 20 and the joint recess 60 when mutually rotationally aligned such that disengagement is allowed. FIG. 5*b*, as is indicated by the curved arrow, illustrates the joint pin 20 (and thus its inner and outer portions 22, 26) being rotated counter-clockwise approximately 20 degrees. FIG. 6*b* shows the interior joint part 10 and the exterior joint part 50 in the corresponding mutual angular position. FIG. 5 *c* illustrates the joint pin 20 when rotated counter-clockwise approximately 180 degrees from the position of FIG. 5*a*. FIG. 6*c* shows the interior joint part 10 and the exterior joint part 50 in the corresponding mutual angular position as FIG. 5*c*.

Now, as is indicated by the braces } in FIGS. 5*b* and 5*c*, in both these angular positions there are overlaps (see braces) that hinder the joint pin 20 and joint recess 60 from being disengaged. In the angular position of FIG. 5*b*, the inner pin portion 22 has been rotated counter-clockwise such that the inner recess portion 62 does not allow the inner pin portion 22 from a translational motion (movement to the right) out of the inner gap 62*g*. More in detail, the clockwise ultimate section 64 (FIG. 4) of the inner recess portion 62 blocks the inner pin portion 22 from movement out from the joint recess 60. In the angular position of FIG. 5*c*, the counter-clockwise ultimate section 68 of the outer recess portion 66 blocks the outer pin portion 26 from movement out from the joint recess 60 (movement to the right). In addition, in the position of FIG. 5*c*, the clockwise ultimate section 64 (FIG. 4) of the inner recess portion 62 blocks the inner pin portion 22 from movement out from the joint recess 60. As is apprehended, in all angular positions between the ones indicated in FIGS. 5*b* and 5*c*, there are corresponding overlaps that hinder the joint pin 20 and joint recess 60 from being disengaged.

In the embodiment of FIGS. 10 to 14, the joint pin 20 has a closed circumference, in other words the inner pin portion 22 as well as the outer pin portion 26 may be circular cylindrical in shape apart from the release sections 24, 28. Such joint pin 20 may be solid (see especially FIGS. 13 and 14) or hollow (not shown).

In the embodiment of FIGS. 1 to 9, the joint pin 20 (and the interior joint part 10) is adapted to be manufactured by injection moulding. Therefore, the joint pin 20 should preferably be thin-walled. In addition, few moulding tools should be required. This has been obtained by the shown S-shaped structure of the joint pin 20. As seen in cross-section, and in the plan view of FIG. 4, the joint pin 20 consists of a meandering structure essentially formed of three axially extending plates. In some detail, there are two radially opposing semi-circular outer plates (see FIGS. 1, 3 and 4) and one central plate that joins the two semi-circular outer plates. Said plates extend in parallel with the longitudinal axis of the joint pin 20. As is also shown, the interior joint part 10 and the exterior joint part 50 are thin-walled and provided with strengthening ribs. In the present disclosure, thin-walled may mean a wall thickness of less than 2.5 millimeters.

Turning now in particular to FIG. 3, the joint pin 20 may comprise a first pin section 20*a* and an axially offset second pin section 20*b*. These two pin sections 20*a*, 20*b* may each correspond to the above-described joint pin. Thus, the first pin section 20*a* comprises a first inner pin portion 22*a* and a first outer pin portion 26*a*. Further, the second pin section 20*b* comprises a second inner pin portion 22*b* and a second outer pin portion 26*b*. Between the first pin section 20*a* and the second pin section 20*b*, there may be a radially protruding portion 30. In other words, the pin section 20*a* and the second pin section 20*b* may coaxially protrude in an opposing manner from the radially protruding portion 30.

In a similar manner, referring to FIG. 2, the joint recess 60 may comprise a first recess section 60*a* and an axially offset second recess section 60*b*. These two recess sections 60*a*, 60*b* may each correspond to the above-described joint recess. Thus, the first recess section 60*a* comprises a first inner recess portion 62*a* and a first outer recess portion 66*a* and the second recess section 60*b* comprises a second inner recess portion 62*b* and a second outer recess portion 66*b*. The recess sections 60*a*, 60*b* may be separated by an axial void. The radially protruding portion 30 of the interior joint part 10 may be received axially between the recess sections 60*a*, 60*b*, see e.g. FIGS. 6*a* to 6*d*.

The concept of the inner and outer pin portions, inner and outer recess portions, the offset inner and outer gaps and the inner and outer offset release sections may be applied in a joint arrangement of a different design than the one depicted herein. For example, there need not be two pin sections 20*a*, 20*b* and two cooperating recess sections 60*a*, 60*b*. Rather, there may be one of each or a greater number than two. Also, such sections may be arranged at a much larger axial distance from one another, as is the case in the embodiment of FIGS. 10 to 14.

Figure 7:
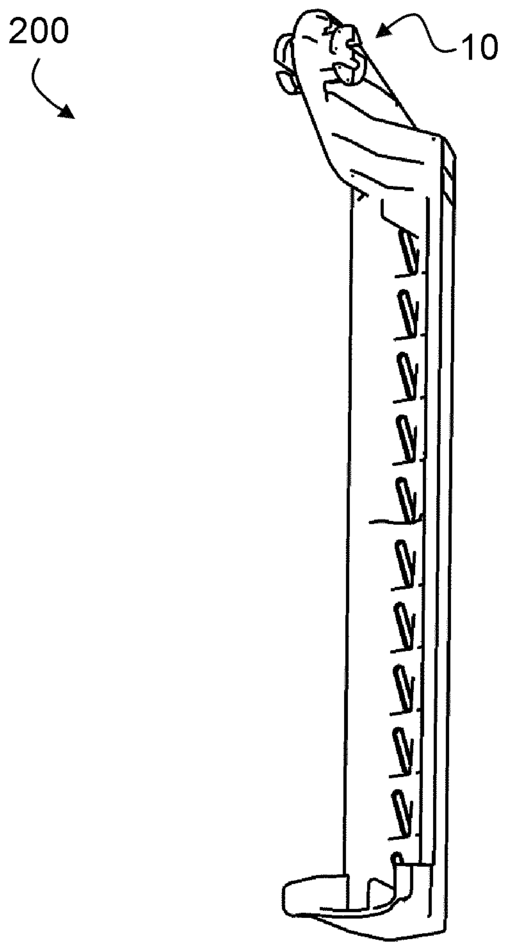
FIG. 7 is an isometric view of a hand support comprising the interior joint part of FIGS. 1, 3 and 4.
Figure 8:
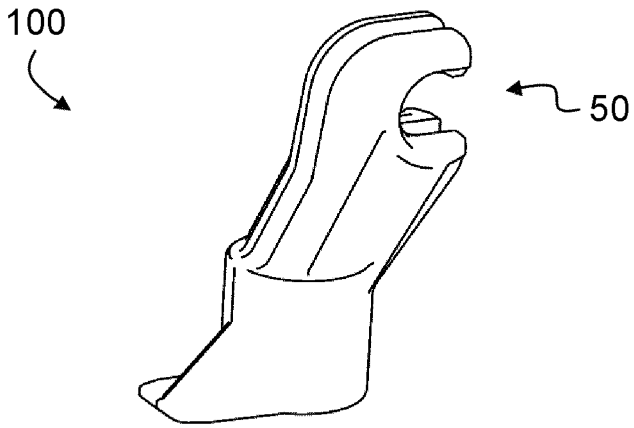
FIG. 8 is an isometric view of a holder comprising the exterior joint part of FIGS. 1, 2 and 4.
Figure 9:
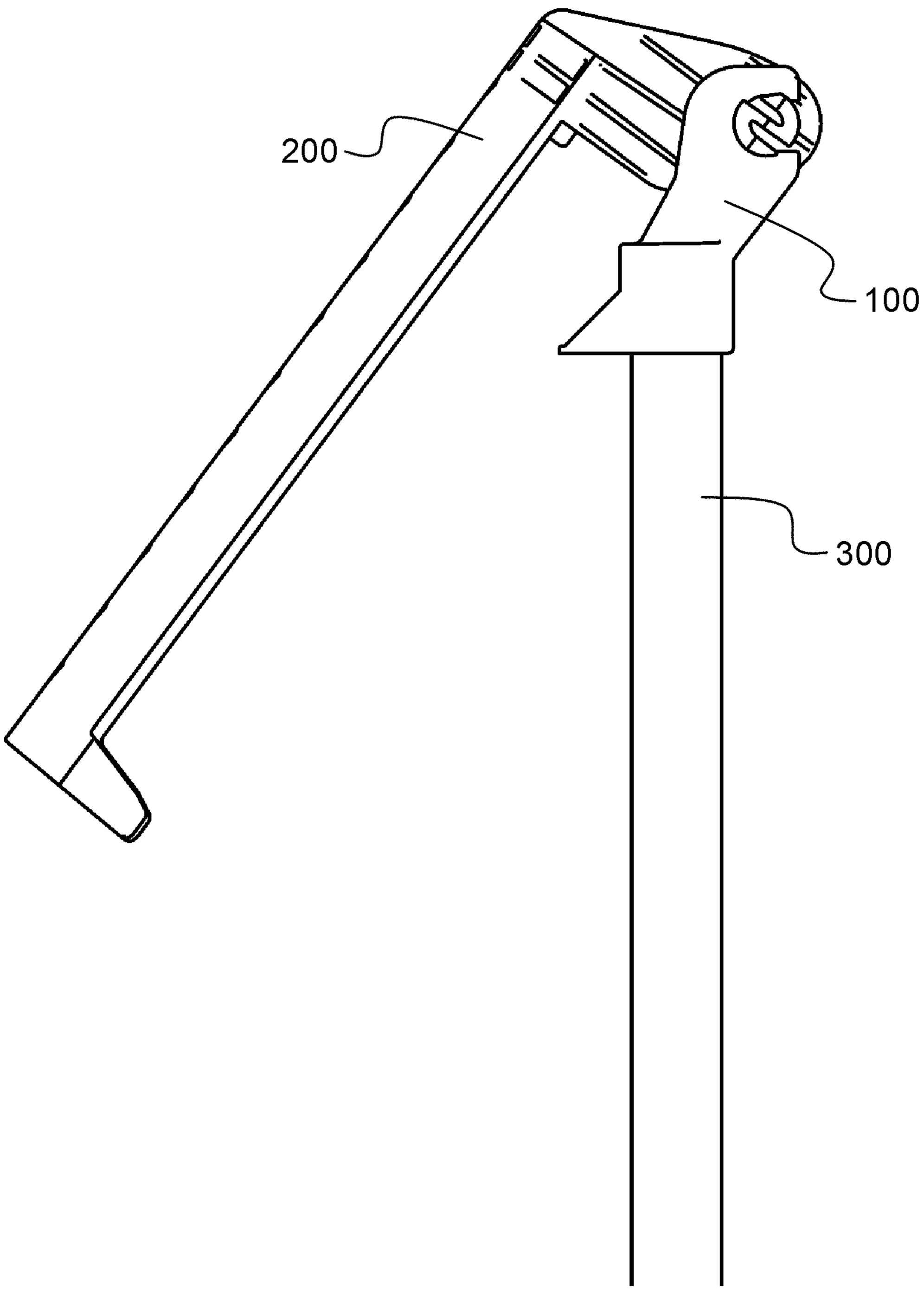
FIG. 9 is a plan view of a ski pole comprising a stick, the hand support of FIG. 7 and the holder of FIG. 8.

Referring to FIGS. 7 to 9, the joint arrangement 1 may form part of a ski pole assembly. Such a ski pole assembly may comprise a hand support 200 (FIG. 7) that is adapted to support a hand of a user. For example, the hand support 200 may be attachable to a hand by means of an undepicted hand strap assembly. The hand support 200 may comprise a series of attachment through-holes or slits (see FIG. 7) for connection of such a hand strap assembly. The ski pole assembly may further comprise a holder 100 (FIG. 8) that is adapted to be secured to a stick 300 (FIG. 9). Now, either the holder 100 or the hand support 200 may comprise the above-described interior joint part 10 or exterior joint part 50.

As is shown, the joint arrangement 1 of the present ski pole assembly comprises a first pin section 20*a* and an axially offset second pin section 20*b* as well as a first recess section 60*a* and an axially offset second recess section 60*b*. Thereby, and thank to the radially protruding portion 30 received between the recess sections 60*a*, 60*b*, the pivotal connection between the hand support 200 and the holder 100 is particularly sturdy.

Figure 6D:
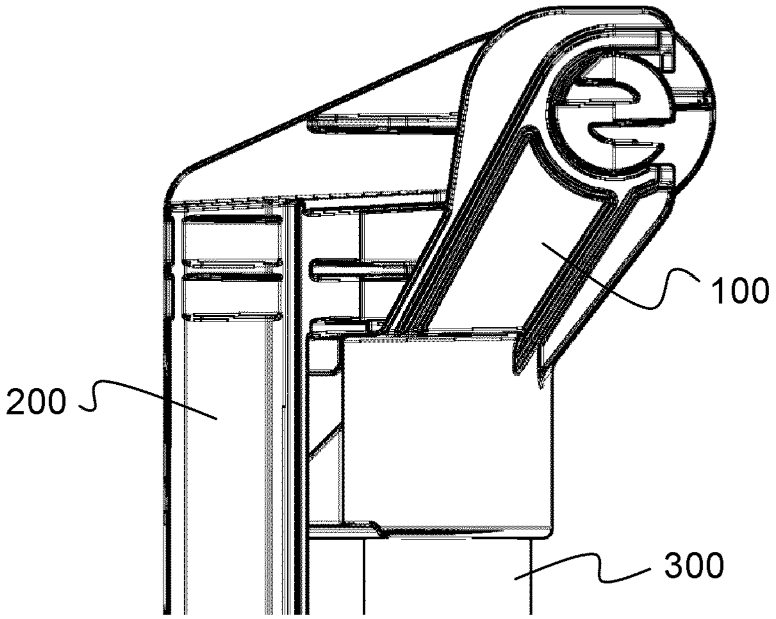

FIG. 9 discloses a ski pole comprising a stick 300, to which a holder 100 is secured, and a hand support 200 that is pivotally attached to the holder 100. The hand support 200 is formed in one piece with the interior joint part 10 and the holder 100 is formed in one piece with the exterior joint part 50. FIG. 9 shows the ski pole in a position where the hand support 200 is pivoted away from the holder 100 and FIG. 6*d* shows a closed position in which the hand support 200 is folded in towards the holder 100 (and thus the stick 300).

Referring to FIGS. 10 to 14, the joint arrangement 1 may form part of a box 300 with a lid 400. In the embodiment of FIGS. 10 to 14, the box is configured to contain an undepicted duct fan, but the present joint arrangement is generally applicable for pivotally connecting a lid to a box.

Figure 10:
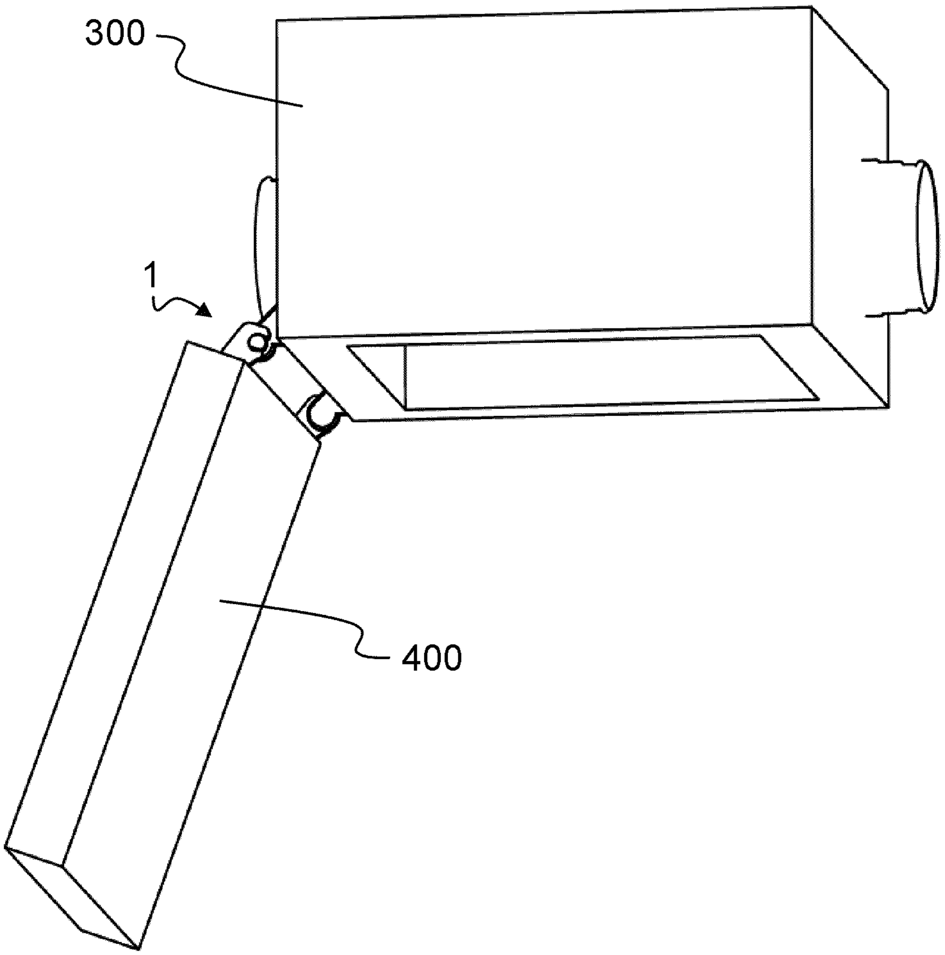
FIG. 10 is an isometric view of a box with a lid comprising a joint arrangement in accordance with FIGS. 1 to 6, FIG. 11 corresponds to FIG. 10, but shows the lid in a closed state and a ceiling to which the box is mounted.
Figure 11:
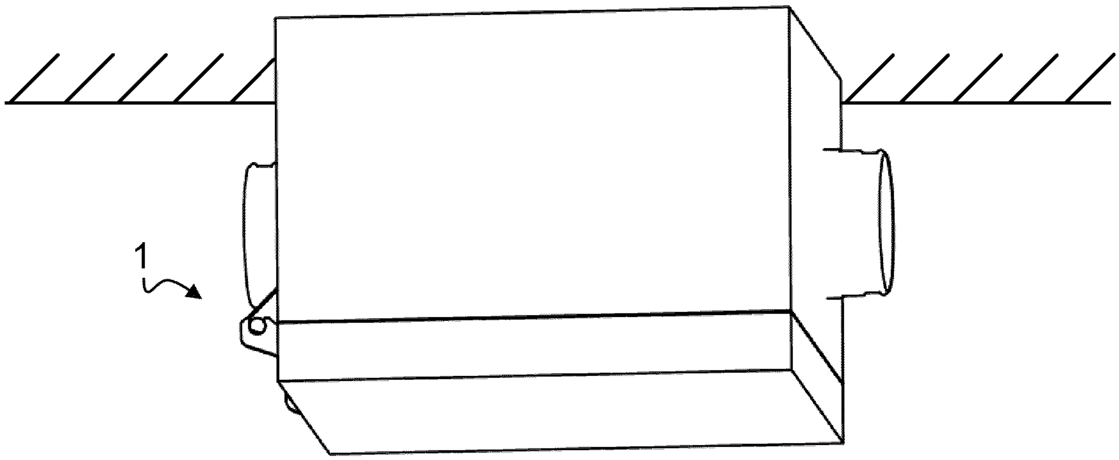
Figure 12:
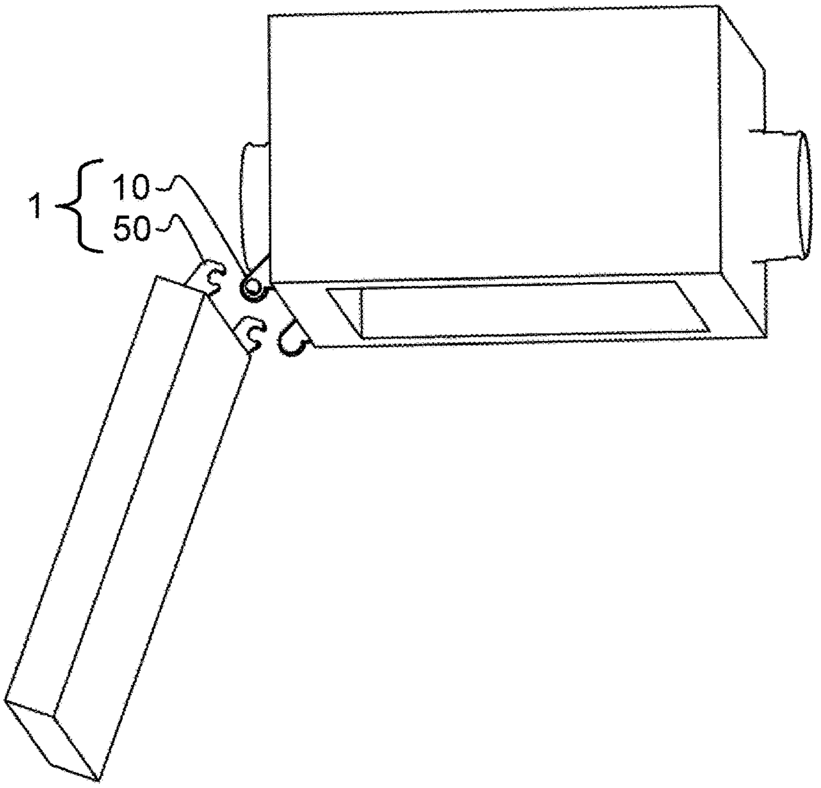
FIG. 12 shows the box and lid of FIGS. 10 and 11, but with the lid released or detached from the box.

As is illustrated in FIGS. 10 and 11, the box, or casing, 300 may be adapted to be mounted in a ceiling with the opening of the box facing downwards. Referring to the above description, the present joint arrangement 1 may be tailored such that the exact angular orientation, and the angular range, at which the joint pin 20 and the joint recess 60 may be disengaged can be selected as desired. Thus, when the joint arrangement 1 is made use of for pivotally and releasably connecting the lid 400 to the box 300, the angular orientation at which the lid 400 may be released from the box 300 may be appropriately selected.

For example, when the box 300 is ceiling mounted, said angle, or release angle, may be selected such that the lid 400 may be detached when the lid 400 extends substantially vertically, which may facilitate for a user to reach the lid 400. However, as in the example of FIGS. 10 to 14, the release angle at which the lid 400 may be detached from the box 300 should preferably not coincide with the angle formed between the open lid 400 and the box 300 when the lid 400 hangs freely from the box 300, to avoid the lid 400 being unintentionally detached.

In order to provide a sturdy pivotal connection between the box 300 and the lid 400, there may be provided two separate joint arrangements 1 each being configured in accordance with FIGS. 1 to 6. Alternatively, as has been described, the joint pin 20 may comprise a first pin section 20*a* and an axially offset second pin section 20*b*, as shown in FIG. 14. Between the first pin section 20*a* and the second pin section 20*b*, there may be a radially protruding portion 30, which in the embodiment of FIGS. 10 to 14 comprises two axially separated portions 30*a*, 30*b*. Similarly, the joint recess 60 may comprise a first recess section 60*a* and an axially offset second recess section 60*b*. Thus, as mentioned above, the concept of the inner and outer pin portions and inner and outer recess portions may be applied in joint arrangements having pin sections and recess sections arranged at a large axial distance from one another, as exemplified. The axial distance may substantially correspond to the width of the lid 400. In the embodiment of FIGS. 10 to 14, the lid may be approximately 100 to 500 millimeters wide.

The present box 300 is exemplified as a duct fan housing and thus comprises an inlet and an outlet for a fluid, typically air. As is illustrated in e.g. FIG. 11, opposing sidewalls of the duct fan casing 300 may comprise a fluid inlet connection and a fluid outlet connection, respectively. The lid 400 is pivotally and releasably attached to the duct fan casing (box) 300 such that the interior of the casing, including the duct fan, is accessible for maintenance and repair. Maintenance may e.g. include exchanging an undepicted filter. The present joint arrangement 1 further facilitates the lid 400 being released and thus exchanged e.g. if damaged. Advantageously, the box 300 and lid 400 may, as is illustrated, be formed in one piece with the joint pin 20 and joint recess 60, respectively.

Figure 13:
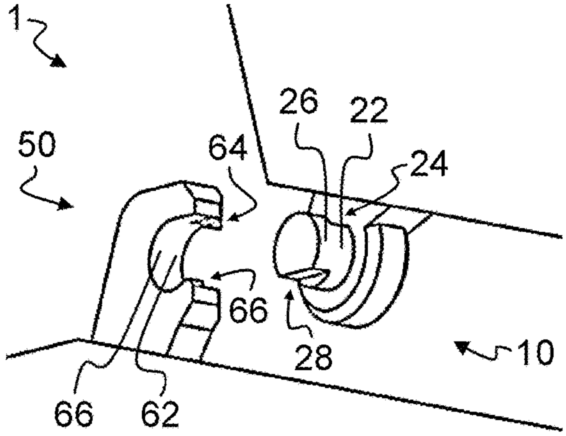
FIG. 13 is an enlarged view of the joint arrangement of the box and lid of FIGS. 10 to 12 in a released state, and FIG. 14 corresponds to FIG. 13 but shows the joint arrangement when assembled or attached.
Figure 14:
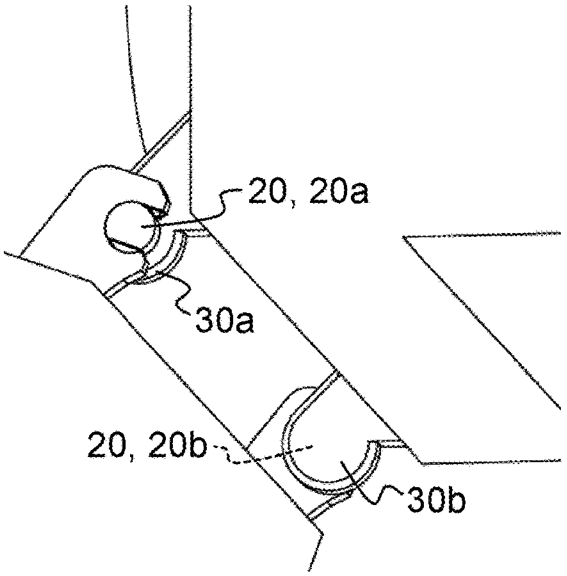

Referring to FIGS. 13 and 14, the interior joint part 10 comprises a joint pin 20 that comprises an inner pin portion 22 and an outer pin portion 26. In this example, the radial dimension of the outer pin portion 26 equals the radial dimension of the inner pin portion 22. Further, the axial extension of the inner pin portion 22 equals the axial extension of the outer pin portion 26.

In examples where the radial dimension of the outer pin portion 26 does not equal the radial dimension of the inner pin portion 22 (see FIG. 1), the joint arrangement 1 may absorb greater axial forces, and/or the radially protruding portion 30 may be of a relatively weak design or even be dispensed with. The terms inner and outer may thus denote radially inner/outer or axially inner/outer.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, the joint arrangement may find use in many other applications, such as for pivotally connecting the front and the rear sections of an A-ladder, etc.

Although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "include/includes" or "comprise/comprises" do not exclude the presence of other elements or steps.

Furthermore, although individual features may be included in different claims (or embodiments), these may possibly advantageously be combined, and the inclusion of different claims (or embodiments) does not imply that a certain combination of features is not feasible and/or advantages. In addition, singular references do not exclude a plurality. Finally, reference signs in the claims are provided merely as a clarifying example and should not be construed as limiting the scope of the claims in any way.

The invention claimed is:

1. A joint arrangement comprising an interior joint part comprising a joint pin comprising an inner pin portion and outer pin portion, and an exterior joint part comprising a joint recess comprising an inner recess portion and an outer recess portion, wherein the inner pin portion is adapted to be journalled in the inner recess portion and the outer pin portion is adapted to be journalled in the outer recess portion, the inner recess portion is adapted to extend around more than half the circumference of the inner pin portion but leave an inner gap through which the inner pin portion may enter and exit the inner recess portion, the outer recess portion is adapted to extend around more than half the circumference of the outer pin portion but leave an outer gap through which the outer pin portion may enter and exit the outer recess portion, the inner gap is circumferentially offset from the outer gap, the inner pin portion comprises an inner release section and the outer pin portion comprises an outer release section, and the inner release section is circumferentially offset from the outer release section, such that the joint pin may enter and exit the joint recess only when the inner release section is rotationally aligned with the inner gap and when the outer release section is rotationally aligned with the outer gap.

2. The joint arrangement of claim 1 consisting of the interior joint part and the exterior joint part.

3. The joint arrangement of claim 1, wherein the interior joint part is formed in one piece and/or the exterior joint part is formed in one piece.

4. The joint arrangement of claim 3, wherein the interior joint part is manufactured by injection moulding and/or the exterior joint part is manufactured by injection moulding.

5. The joint arrangement of claim 3, wherein the interior joint part is thin-walled and/or the exterior joint part is thin-walled.

6. The joint arrangement of claim 5, wherein the joint pin is formed of a meandering, thin-walled structure.

7. The joint arrangement of claim 1, wherein the inner release section is formed by a flat side of the inner pin portion.

8. The joint arrangement of claim 1, wherein the inner pin portion circumference has the general shape of a circle with a flat side, the flat side forming the inner release section.

9. The joint arrangement of claim 1, wherein the outer pin portion circumference has the general shape of a circle with a flat side, the flat side forming the outer release section.

10. The joint arrangement of claim 1, wherein the inner release section is arranged opposite the outer release section.

11. The joint arrangement of claim 1, wherein the joint pin comprises a first pin section and an axially offset second pin section, the first pin section comprising a first inner pin portion and a first outer pin portion and the second pin section comprising a second inner pin portion and a second outer pin portion.

12. The joint arrangement of claim 11, wherein the joint recess comprises a first recess section and an axially offset second recess section, the first recess section comprising a first inner recess portion and a first outer recess portion and the second recess section comprising a second inner recess portion and a second outer recess portion.

13. The joint arrangement of claim 12, wherein the interior joint part comprises a radially protruding portion arranged between the first pin section and the second pin section, and wherein the joint arrangement is configured such that the protruding portion may be received between the first recess section and the second recess section.

14. The joint arrangement of claim 1, wherein the joint arrangement is suitable for a ski pole with a pivotable hand support.

15. A ski pole assembly comprising the joint arrangement of claim 1, the ski pole assembly comprising a hand support adapted to support a hand of a user and a holder adapted to be attached to a stick, wherein the interior joint part is comprised in one of the hand support or the holder and the exterior joint part is comprised in the other one of the hand support and the holder.

16. A ski pole comprising a stick and the ski pole assembly of claim 15.

17. A box with a lid comprising the joint arrangement according claim 1, wherein the interior joint part is comprised in one of the box or the lid and the exterior joint part is comprised in the other one of the box and the lid.

18. The box with a lid of claim 17, wherein the joint pin comprises a first pin section and an axially offset second pin section, the first pin section comprising a first inner pin portion and a first outer pin portion and the second pin section comprising a second inner pin portion and a second outer pin portion, and wherein the first pin section and the second pin section are axially offset by at least 100 millimeters.

19. The box with a lid of claim 17, wherein the joint recess comprises a first recess section and an axially offset second recess section, the first recess section comprising a first inner recess portion and a first outer recess portion and the second recess section comprising a second inner recess portion and a second outer recess portion, and wherein the first recess section and the second recess section are axially offset by at least 100 millimeters.

20. The box with a lid according claim 17, wherein the box is adapted to be mounted to a ceiling.

21. The box with a lid according to claim 17, wherein the box comprises a fan, a fluid inlet connection and a fluid outlet connection.

* * * * *